(12) United States Patent
Oem et al.

(10) Patent No.: US 9,323,094 B2
(45) Date of Patent: Apr. 26, 2016

(54) TOUCH PANEL

(71) Applicant: LG INNOTEK CO., LTD., Seoul (KR)

(72) Inventors: Seong Su Oem, Seoul (KR); Hyun Min Nah, Seoul (KR); Yong Suk Kim, Seoul (KR); Jin Bok Kim, Seoul (KR); Myung Ki Min, Seoul (KR); Woo Ju Jeong, Seoul (KR); Jae Hak Her, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 116 days.

(21) Appl. No.: 14/087,449

(22) Filed: Nov. 22, 2013

(65) Prior Publication Data

US 2014/0139759 A1 May 22, 2014

(30) Foreign Application Priority Data

Nov. 22, 2012 (KR) .................. 10-2012-0133165
Nov. 22, 2012 (KR) .................. 10-2012-0133168

(51) Int. Cl.
*G06F 3/041* (2006.01)
*G02F 1/1333* (2006.01)
*G06F 3/044* (2006.01)

(52) U.S. Cl.
CPC ............ *G02F 1/13338* (2013.01); *G06F 3/044* (2013.01)

(58) Field of Classification Search
CPC ......... G06F 3/044; G06F 21/32; G06F 21/84; G06F 3/045; G06F 21/6209; G06F 2221/2139; G06F 3/0412; G06F 2203/04111; G06F 2203/04103; G06F 3/042; G06F 3/041; G06F 3/0421; G06F 1/1643; G06F 3/0414; G06F 3/0418; G06F 1/16; G06F 1/169; G06F 1/1692; G09G 3/3611
USPC ......................... 345/156, 173–175
See application file for complete search history.

(56) References Cited

U.S. PATENT DOCUMENTS

| 2010/0182272 A1* | 7/2010 | Kang et al. ............. 345/174 |
| 2011/0193801 A1* | 8/2011 | Jung et al. ............. 345/173 |
| 2011/0242021 A1 | 10/2011 | Jun et al. |
| 2011/0267308 A1* | 11/2011 | Park et al. ............. 345/174 |

(Continued)

FOREIGN PATENT DOCUMENTS

| JP | 2012-103968 A | 5/2012 |
| KR | 10-2010-0084254 A | 7/2010 |
| TW | 201135556 A | 10/2011 |

(Continued)

OTHER PUBLICATIONS

Office Action dated Oct. 30, 2013 in Korean Application No. 10-2012-0133165, filed Nov. 22, 2012.

(Continued)

*Primary Examiner* — Duc Dinh
(74) *Attorney, Agent, or Firm* — Saliwanchik, Lloyd & Eisenschenk (57) ABSTRACT

Disclosed is a touch panel. The touch panel includes a substrate, a sensor part on the substrate, a connection electrode to connect the sensor part on the substrate, and an anti-view part on the connection electrode. A position of the connection electrode corresponds to a position of the anti-view part. A method of fabricating the touch panel includes forming the sensor part on the substrate, forming a connection electrode layer on the substrate, and patterning the connection electrode layer. The connection electrode layer includes a conductive layer and an anti-view layer.

17 Claims, 12 Drawing Sheets

(56) References Cited

U.S. PATENT DOCUMENTS

| | | |
|---|---|---|
| 2013/0135224 A1 | 5/2013 | Lee et al. |
| 2014/0022467 A1 | 1/2014 | Chai et al. |

FOREIGN PATENT DOCUMENTS

| | | |
|---|---|---|
| TW | 201142673 A | 12/2011 |
| TW | M434258 U | 7/2012 |
| TW | M434989 U | 8/2012 |
| WO | WO-2012099394 A2 | 7/2012 |
| WO | WO-2014021629 A1 | 2/2014 |

OTHER PUBLICATIONS

Office Action dated Apr. 28, 2015 in Taiwanese Application No. 102142040.

Partial European Search Report in European Application No. 13194005.8, dated May 7, 2015.

* cited by examiner

TOUCH PANEL

CROSS-REFERENCE TO RELATED APPLICATIONS

This application claims the benefit under 35 U.S.C. §119 of Korean Patent Application Nos. 10-2012-0133165, filed Nov. 22, 2012, and 10-2012-0133168, filed Nov. 22, 2012, which are hereby incorporated by reference in their entirety.

BACKGROUND

The disclosure relates to a touch panel.

Recently, a touch panel, which performs an input function through the touch of an image displayed on a display device by an input device such as a stylus pen or a hand, has been applied to various electronic appliances.

The touch panel may be representatively classified into a resistive type touch panel and a capacitive type touch panel. In the resistive type touch panel, the position of the touch point is detected by detecting the variation of resistance according to the connection between electrodes when pressure is applied to an input device. In the capacitive type touch panel, the position of the touch point is detected by detecting the variation of capacitance when a finger of the user is touched on the capacitive type touch panel between electrodes. When taking into consideration the convenience of a fabrication scheme and a sensing function, the capacitive type touch panel has been recently spotlighted in a smaller model.

Meanwhile, when a transparent electrode of the touch panel is formed at a single layer, although the thickness of the transparent electrode is reduced, a connection electrode is formed to connect electrode layers with each other. Accordingly, the realization procedure of the touch panel is complicated and difficult.

Further, the touch panel has a problem that the connection electrode is viewed due to external incident light or incident light onto an LCD provided on the touch panel.

BRIEF SUMMARY

The embodiment provides a touch panel having improved visibility.

According to the embodiment, there is provided a touch panel including a substrate, a sensor part on the substrate, a connection electrode to connect the sensor part on the substrate, and an anti-view part provided on the connection electrode. A position of the connection electrode corresponds to a position of the anti-view part.

According to the embodiment, there is provided a method of fabricating the touch panel includes forming the sensor part on the substrate, forming a connection electrode layer on the substrate, and patterning the connection electrode layer. The connection electrode layer includes a conductive layer and an anti-view layer.

As described above, according to the embodiment, the touch panel includes an anti-view part provided on the connection electrode. The anti-view part can inhibit the connection electrode from being viewed. In other words, the anti-view part can inhibit the connection electrode from being viewed due to the external incident light or light incident onto the LCD. Therefore, the visibility of the touch panel can be improved, so that the reliability of the touch panel can be improved.

The touch panel according to the embodiment includes the first insulating layer and the second insulating layer provided at mutually different layers. The patterns of the first insulting layer and the connection electrode can be inhibited from being viewed through the second insulating layer. Accordingly, the visibility of the touch panel can be improved.

According to the method of fabricating the touch panel of the embodiment, the pattern of the connection electrode can be formed without an etching process by performing an exposure and development process with respect to an anti-view layer. In other words, the connection electrode and the anti-view part may be simultaneously formed through the patterning process.

According to the embodiment, the method of fabricating the touch panel can be simplified. In other words, when forming the connection electrode, the anti-view part can be formed simultaneously, thereby reducing the process time, so that the touch panel having improved pattern visibility can be provided.

DETAILED DESCRIPTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiments will be described in detail with reference to accompanying drawings.

Figure 1:
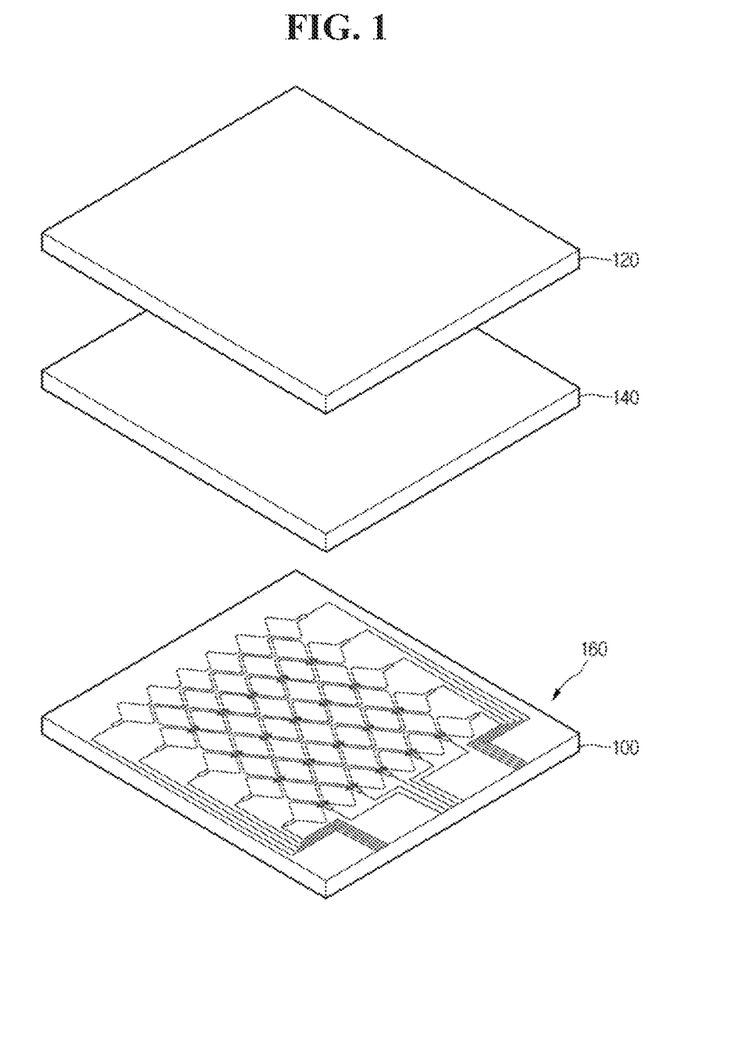
FIG. 1 is an exploded perspective view showing a touch panel according to the embodiment.
Figure 2:
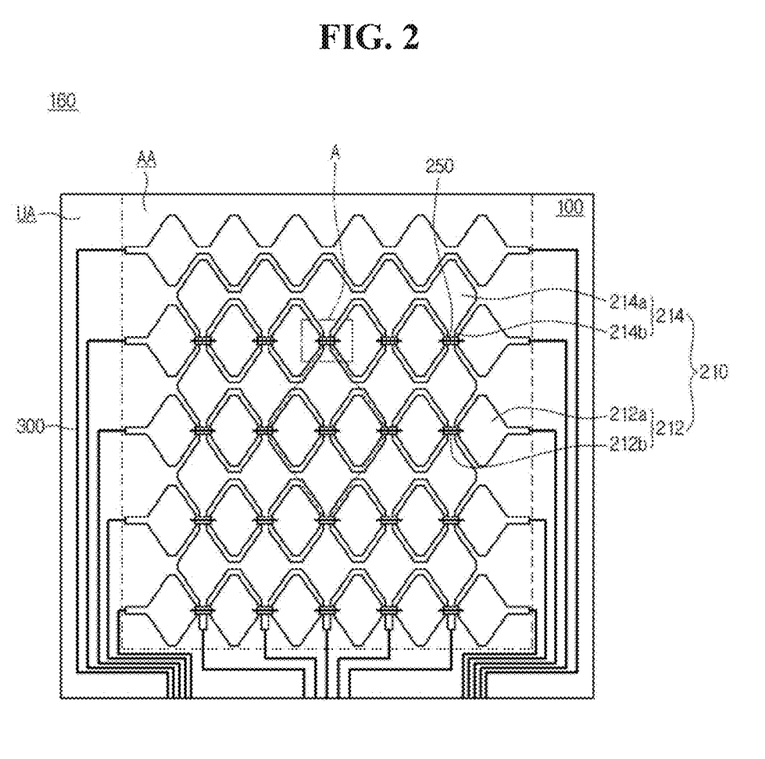
FIG. 2 is a plan view showing an electrode substrate.
Figure 3:
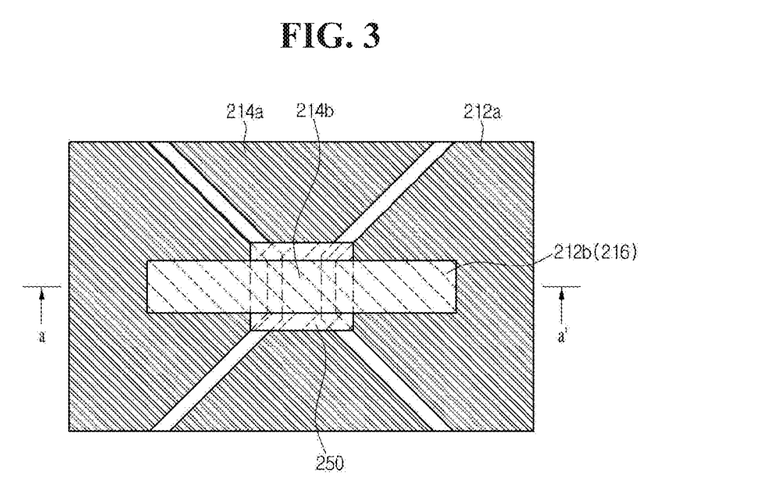
FIG. 3 is an enlarged plan view of a part A of FIG. 2.
Figure 4:
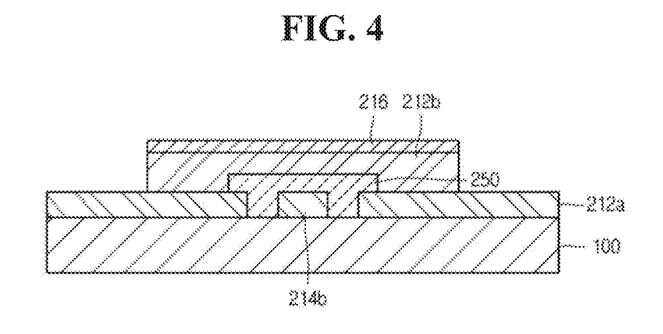
FIG. 4 is a sectional view taken along line a-a' of FIG. 3.

First, the touch panel according to one embodiment will be described with reference to FIGS. 1 to 4. FIG. 1 is an exploded perspective view showing a touch panel according to the embodiment, and FIG. 2 is a plan view showing an electrode substrate. FIG. 3 is an enlarged plan view of a part A of FIG. 2, and FIG. 4 is a sectional view taken along line a-a' of FIG. 3.

Referring to FIG. 1, a touch panel according to the present embodiment includes a protective substrate 120, an adhesive layer 140, and an electrode substrate 160.

The protective substrate 120 is provided at the uppermost part of the touch panel. The protective substrate 120 may protect the electrode substrate 160. The protective substrate 120 may include cover glass.

The adhesive layer 140 may combine the protective substrate 120 with the electrode substrate 160. The adhesive layer 140 may include an optically clear adhesive (OCA).

Referring to FIG. 2, the electrode substrate 160 includes a substrate 100, a transparent electrode 210, an insulating layer 250, a wire 300, and a circuit substrate.

In detail, the electrode substrate 160 includes the substrate 100 defined therein with an active area AA, in which the position of an input device (e.g., a finger) is sensed, and an unactive area UA provided around the active area AA.

In this case, the transparent electrode 210 may be formed in the active area AA to sense the input device, in addition, a wire 300 may be formed in the unactive area UA to electrically connect the transparent electrode 210. In addition, an external circuit connected with the wire 300 may be located in the unactive area UA. The unactive area UA may be provided therein with an outer dummy layer having a logo therein.

If the input device such as the finger of the user is touched on the above touch panel, the variation of a capacitance occurs in the touched part on the touch panel. The part of the touch panel, in which the variation of the capacitance occurs, may be detected a touch point.

Hereinafter, the above touch panel will be described in more detail.

The substrate 100 may include various materials to support the transparent electrode 210, the insulating layer 250, the wire 300, and the circuit substrate that are formed on the substrate 100. For example, the substrate 100 may include a glass substrate or a plastic substrate.

The external dummy layer 101 is formed in the unactive area UA of the substrate 100. The external dummy layer 101 may be coated with a material having a predetermined color so that the wire 300 and the printed circuit pattern to connect the wire 300 with an external circuit are not viewed at the outside. The external dummy layer may have a color appropriate to a required outer appearance. For example, the external dummy layer may include black pigments to represent a black color. A required logo may be formed in the external dummy layer through various schemes. The external dummy layer may be formed through a deposition scheme, a printing scheme, and a wet coating scheme.

The transparent electrode 210 may be formed on the substrate 100. The transparent electrode 210 may sense the touch of the input device such as a finger of a user.

Referring to FIGS. 2 and 4, the transparent electrode 210 includes a first electrode 212 and a second electrode 214.

The first electrode 212 includes a plurality of first sensor parts 212a and a first connection electrode part 212b to connect the first sensor parts 212a with each other. The first connection electrode part 212b connects the first sensor parts 212a with each other in a first direction (X axis direction of drawings), so that the first electrode 212 may extend in the first direction.

Similarly, the second electrode 214 includes a plurality of second sensor parts 214a to sense the touch of the input device such as a finger of a user and a second connection electrode part 214b to connect the second sensor parts 214a with each other. The second connection electrode part 214b connects the second sensor parts 214a with each other in a second direction (Y axis direction of drawings) crossing the first direction, so that the second electrode 214 may extend in the second direction.

The touch panel according to one embodiment has a structure in which the first sensor part 212a, the second sensor part 214a, and the second connection electrode part 214b are closer to the substrate 100 as compared with the first connection electrode part 212b.

The first and second sensor parts 212a and 214a, and the first and second connection electrode parts 212b and 214b may include a transparent conductive material to allow electricity to flow without interruption of the tight transmission. The transparent conductive material may include various materials such as indium tin oxide or indium zinc oxide.

Although drawings show that the first and second sensor parts 212a and 214a have a diagonal shape, the embodiment is not limited thereto. Accordingly, the first and second sensor parts 212a and 214a may have various shapes including a polygonal shape, such as a triangular shape or a square shape, a circular shape, or an oval shape.

The insulating layer 250 is formed on the first sensor part 212a, the second sensor part 214a, and the second connection electrode part 214b. The insulating layer 250 may inhibit the first electrode 212 from being shorted with respect to the second electrode 214. The insulating layer 250 is provided thereon with the first connection electrode part 212b to connect the first sensor parts 212a with each other.

The insulating layer 250 may include a transparent conductive material to inhibit the electric short.

Referring to FIG. 4, the first connection electrode part 212b is provided thereon with an anti-view part 216. The anti-view part 216 is located corresponding to the first connection electrode part 212b. In other words, the anti-view part 216 may be provided only at a position in which the first connection electrode part 212b is located. The anti-view part 216 is provided on the top surface of the first connection electrode part 212b. An end portion of the anti-view part 216 and an end portion of the first connection electrode part 212b are provided on the same plane. In other words, the top surface of the anti-view part 216 and the top surface of the first connection electrode part 212b may have the same area.

The anti-view part 216 can inhibit the first connection electrode part 212b from being viewed. In other words, the anti-view part 216 can inhibit the first connection electrode part 212b from being viewed due to external incident light or light incident onto the LCD, Accordingly, the reliability of the touch panel can be improved by improving the visibility of the touch panel.

Hereinafter, a method of fabricating the touch panel according to the embodiment will be described in detail with reference to FIGS. 5 to 8. In addition, components and a structure the same as or similar to those described above will not be further described below for clarity. FIGS. 5 to 8 are sectional views to explain the method of fabricating the touch panel according to the embodiment.

Figure 5:
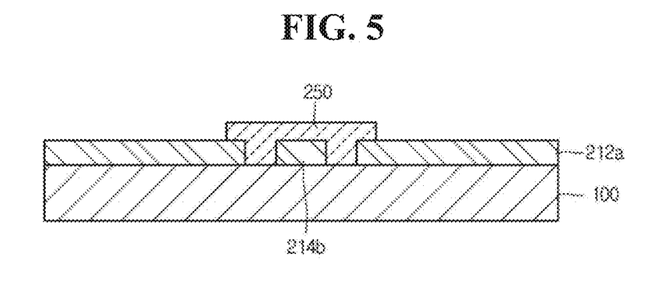
FIGS. 5 to 8 are sectional views showing a method of fabricating the touch panel according to the embodiment.

First, referring to FIG. 5, the first sensor part 212a, the second sensor part 214a, and the second connection electrode part 214b are formed on the substrate 100, and the insulating layer 250 is formed on the first sensor part 212a, the second sensor part 214a, and the second connection electrode part 214b.

Figure 6:
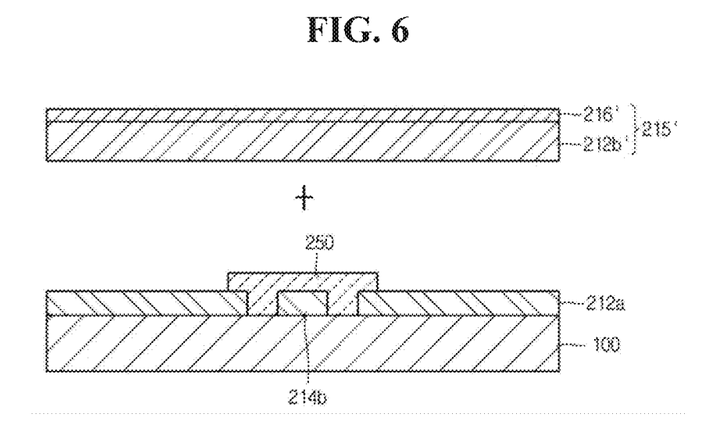

Thereafter, referring to FIG. 6, a connection electrode layer 215' is located on the substrate 100. The connection electrode layer 215' includes a conductive layer 212b' and an anti-view layer 216'.

The conductive layer 212b' may include various materials, such as ITO, IZO, Ag nanowire, and ZTO (Zinc Tin Oxide), which may be used for an electrode.

The anti-view layer 216' is provided on the conductive layer 212b'. The anti-view layer 216' may be located on the entire surface of the conductive layer 212b'. The anti-view layer 216' may include a material, such as a photoresist material, that may be easily developed. In other words, the anti-view layer 216' may have a structure similar to that of a dry film resistance structure that is transparent and flexible. The anti-view layer 216' may have the thickness of 5 μm or less.

The connection electrode layer 215' may have the form of a film in which the conductive layer 212b' is integrated with the anti-view layer 216'.

Figure 7:
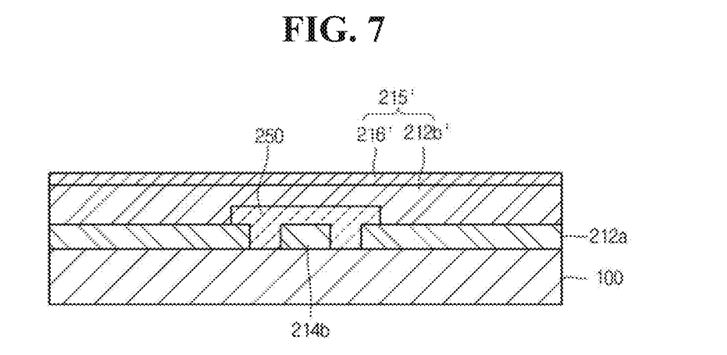

Referring to FIG. 7, the connection electrode layer 215' may be formed on the substrate 100 through a lamination process.

Figure 8:
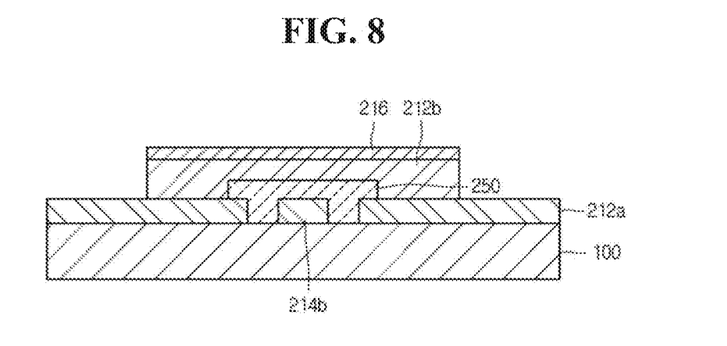

Thereafter, referring to FIG. 8, the connection electrode layer 215' may be patterned. In particular, the pattern of the connection electrode may be formed without an etching process by performing an exposure and development process with respect to the anti-view layer 216' including the photoresist material. In other words, the first connection electrode part 212b and the anti-view part 216 may be simultaneously formed through the patterning process.

According to the embodiment, the method of fabricating the touch panel can be simplified. In other words, when forming the first connection electrode part 212b, the anti-view part 216 can be formed simultaneously, thereby reducing the process time, so that the touch panel having improved pattern visibility can be provided.

Figure 9:
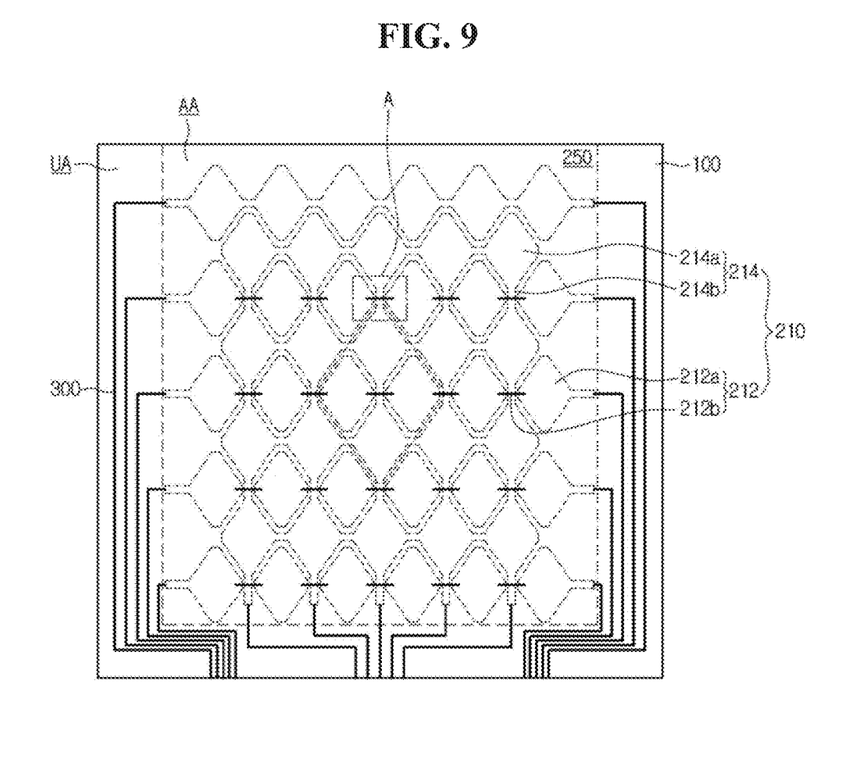
FIG. 9 is a plan view showing the touch panel according to one embodiment.

Meanwhile, referring to FIG. 9, the touch panel according to the embodiment includes the substrate 100 having the active area AA, in which an input device (e.g., a finger) is sensed, and the unactive area UA provided around the active area AA.

In this case, the transparent electrode 210 may be formed in the active area AA to sense the input device. In addition, a wire 300 may be formed in the unactive area UA to electrically connect the transparent electrode 210. In addition, an external circuit connected with the wire 300 may be located in the unactive area UA. The unactive area UA may be provided therein with an external dummy layer having a logo therein.

If the input device such as a finger is touched on the above touch panel, the variation of a capacitance occurs in the touched part of the input device. The part of the touch panel, in which the variation of the capacitance occurs, may be detected a touch point.

Hereinafter, the above touch panel will be described in more detail.

The substrate 100 may include various materials to support the transparent electrode 210, the insulating layer 250, the wire 300, and the circuit substrate that are formed on the substrate 100. For example, the substrate 100 may include a glass substrate or a plastic substrate.

The external dummy layer 101 is formed in the unactive area UA of the substrate 100. The external dummy layer 101 may be coated with a material having a predetermined color so that the wire 300 and the printed circuit pattern to connect the wire 300 with an external circuit are not viewed at the outside. The external dummy layer may have a color appropriate to a required outer appearance. For example, the external dummy layer may include black pigments to represent a black color. A required logo may be formed in the external dummy layer through various schemes. The external dummy layer may be formed through a deposition scheme, a printing scheme, and a wet coating scheme.

The transparent electrode 210 may be formed on the substrate 100. The transparent electrode 210 may sense the touch of the input device such as a finger of a user.

The transparent electrode 210 includes the first electrode 212 and the second electrode 214.

The first electrode 212 includes the first sensor parts 212a to detect whether or not the input device such as the finger of the user is touched and the first connection electrode part 212b to connect the first sensor parts 212a with each other. The first connection electrode part 212b connects the first sensor parts 212a with each other in a first direction (X axis direction of drawings), so that the first electrode 212 may extend in the first direction.

Similarly, the second electrode 214 includes the second sensor parts 214a to sense the touch of the input device such as the finger of the user and the second connection electrode part 214b to connect the second sensor parts 214a with each other. The second connection electrode part 214b connects the second sensor parts 214a with each other in the second direction (Y axis direction of drawings) crossing the first direction, so that the second electrode 214 may extend in the second direction.

The touch panel according to one embodiment has a structure in which the first sensor part 212a, the second sensor part 214a, and the second connection electrode part 214b are closer to the substrate 100 as compared with the first connection electrode part 212b.

The first and second sensor parts 212a and 214a, and the first and second connection electrode parts 212b and 214b may include a transparent conductive material to allow electricity to flow without interruption of the light transmission. The transparent conductive material may include various materials such as indium tin oxide or indium zinc oxide.

Although drawings show that the first and second sensor parts 212a and 214a have a diagonal shape, the embodiment is not limited thereto. Accordingly, the first and second sensor parts 212a and 214a may have various shapes including a polygonal shape, such as a triangular shape or a square shape, a circular shape, or an oval shape.

Figure 11:
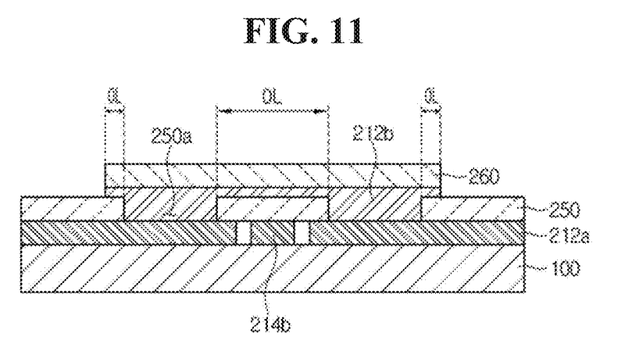
FIG. 11 is a sectional view taken along line a-a' of FIG. 10.

The insulating layer includes first and second insulating layers 250 and 260 provided at mutually different layers. The first and second insulating layers 250 and 260 may be provided while interposing the first connection electrode part 212b between the first and second insulating layers 250 and 260. In other words, the first and second insulating layers 250 and 260 may sandwich the first connection electrode part 212b therebetween.

The first insulating layer 250 may be provided on the first sensor part 212a, the second sensor part 214a, and the second connection part 214b. In detail, the first insulating layer 250 may be formed on the entire surface of the first and second sensor parts 212a and 214a and the second connection electrode part 214b. In addition, the first insulating layer 250 may include a hole 250a so that the first sensor part 212a and the first connection electrode part 212b may be connected with each other.

Figure 10:
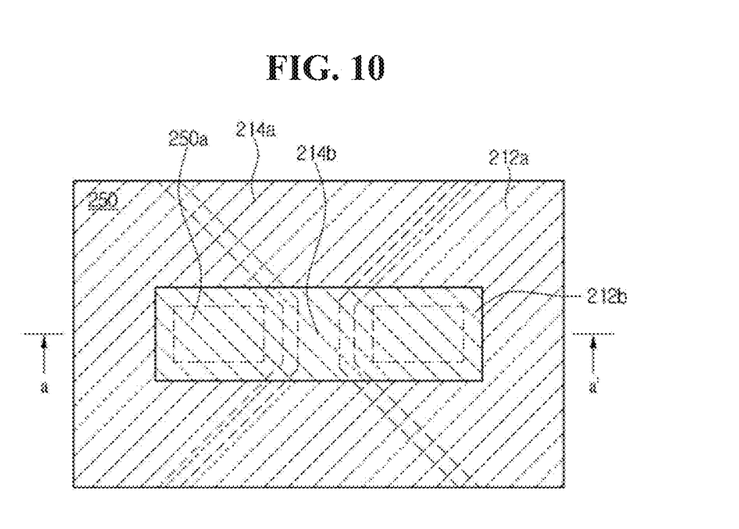
FIG. 10 is an enlarged plan view showing a part A of FIG. 9.

Referring to FIG. 10, the substrate 100 is provided thereon with the first sensor part 212a, the second sensor part 214a, and the second connection electrode part 214b, and the first insulating layer 250 is formed on the first sensor part 212a, the second sensor part 214a, and the second connection electrode part 214b. The first insulating layer 250 is provided thereon with the first connection electrode part 212b to connect the first sensor part 212a.

The first insulating layer 250 may include a transparent conductive material to inhibit the electrical short.

Referring to FIG. 11, the second insulating layer 260 may be provided on the first connection electrode part 212b. The second insulating layer 260 may be located corresponding to the first connection electrode part 212b. In other words, the second insulating layer 260 may be located at the same position as that of the first connection electrode part 212b.

The second insulating layer 260 may include the same material as that of the first insulating layer 250, but the embodiment is not limited thereto. The second insulating layer 260 may include a photoresist material. For example, the second insulating layer 260 may include a liquid photoresist material or a dry film resistance material.

The problem that the patterns of the first insulating layer 250 and the first connection electrode part 212b are viewed can be overcome due to the second insulating layer 260. Accordingly, the visibility of the touch panel can be improved.

Figure 12:
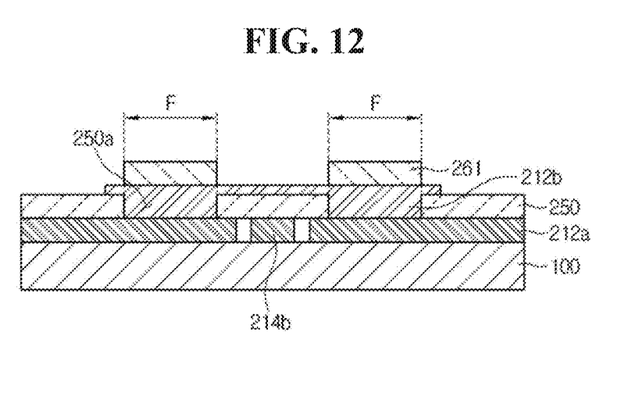
FIG. 12 is a sectional view showing the touch panel according to one embodiment.

Meanwhile, referring to FIG. 12, the second insulating layer 261 may be provided only at a part F corresponding to that of the hole 250a of the first insulating layer 250. Accordingly the second insulating layer 262 may be offset from the first insulating layer 250 in a vertical direction. In the structure of FIG. 11, an overlap section OL in which the first insulating layer 250 is overlapped with the second insulating layer 261 is made. However, according to the embodiment shown in FIG. 12, the visibility of the touch panel can be improved by removing the overlap section OL. In other words, according to the embodiment of FIG. 12, the second insulating layer 261 is filled in a part in which the first insulating layer 250 is not formed.

The touch panel according to one embodiment has a structure in which the first sensor part 212a, the second sensor part 214a, and the second connection electrode part 214b are closer to the substrate 100 as compared with the first connection electrode part 212b.

Hereinafter, the touch panel according to the embodiment will be described in detail with reference to FIGS. 13 to 16. In addition, components and a structure the same as or similar to those described above will not be further described below for clarity.

Figure 15:
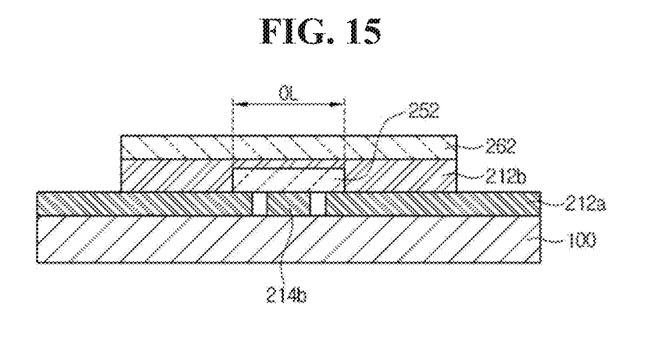
FIG. 15 is a sectional view taken along line b-b' of FIG. 14.
Figure 16:
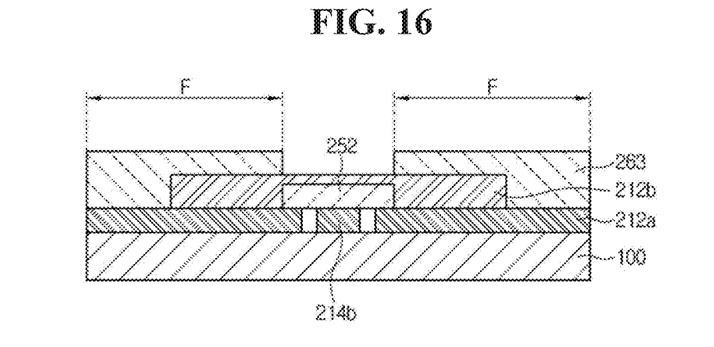
FIG. 16 is a sectional view showing the touch panel according to one embodiment.

A first insulating layer 252 is partially provided on the second electrode connection part 214b. In other words, the first insulating layer 252 is partially provided between the first and second electrode connection parts 212b and 214b.

The second insulating layer 262 may be provided on the first connection electrode part 212b. The second insulating layer 262 may be located corresponding to the first connection electrode part 212b. In other words, the second insulting layer 262 may be provided at the same position as that of the first connection electrode part 212b.

Meanwhile, the substrate 100 may include a first region in which the first insulating layer 252 is provided and a second region surrounding the first region. In this case, referring to FIG. 16, the second insulating layer 263 may be provided in the second region. In other words, the second insulating layer 263 may be provided in a part of the touch panel in which the first insulating layer 252 is not formed. Accordingly, the second insulating layer 263 may be offset from the first insulating layer 252 in a vertical direction. That is to say, in the structure of FIG. 15, an overlap section OL in which the first insulating layer 252 is overlapped with the second Insulating layer 262 is made. However, according to the embodiment shown in FIG. 16, the visibility of the touch panel can be improved by removing the overlap section OL. In other words, according to the embodiment of FIG. 16, the second insulating layer 263 is filled in the part F in which the first insulating layer 252 is not formed.

Figure 17:
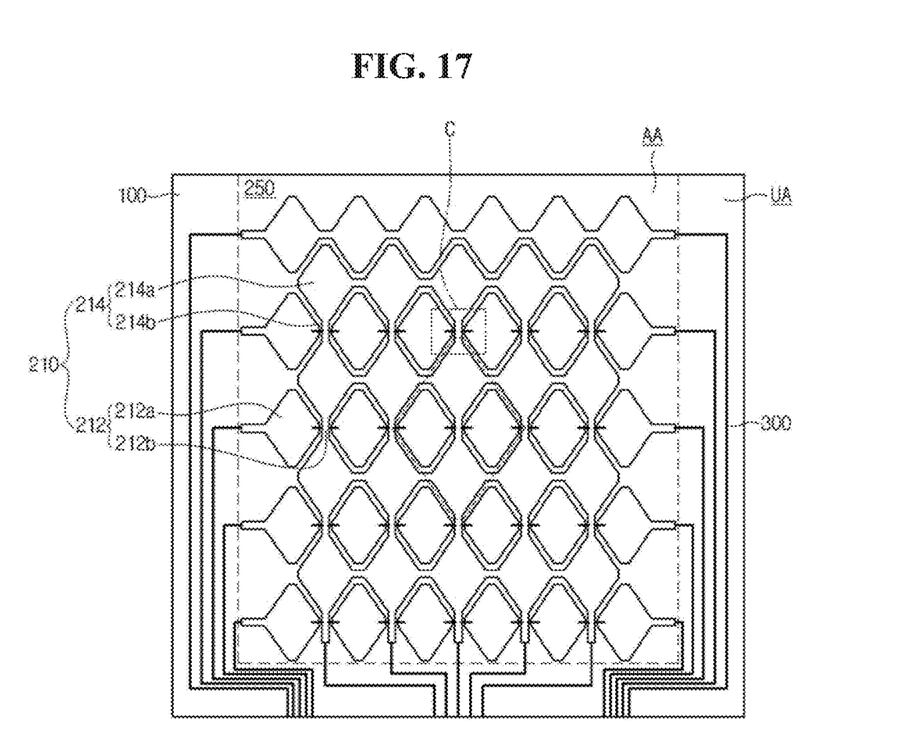
FIG. 17 is a plan view showing the touch panel according to one embodiment.
Figure 18:
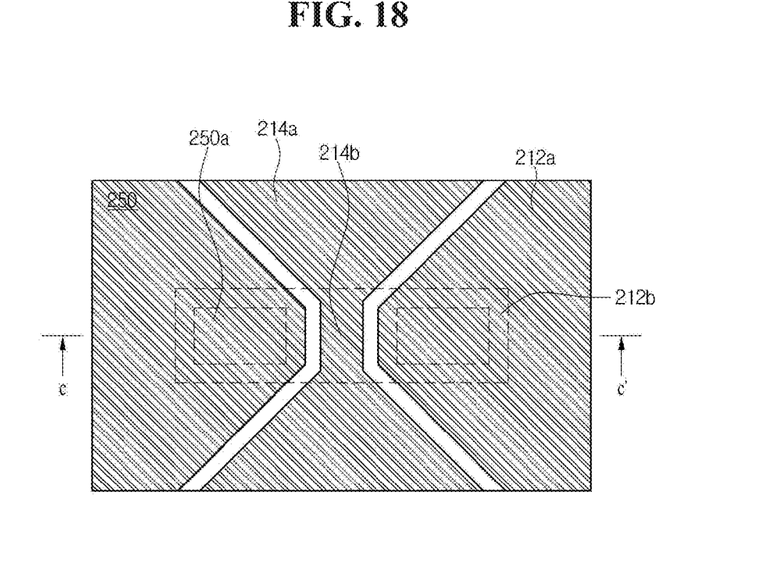
FIG. 18 is an enlarged plan view of a part C of FIG. 17.
Figure 19:
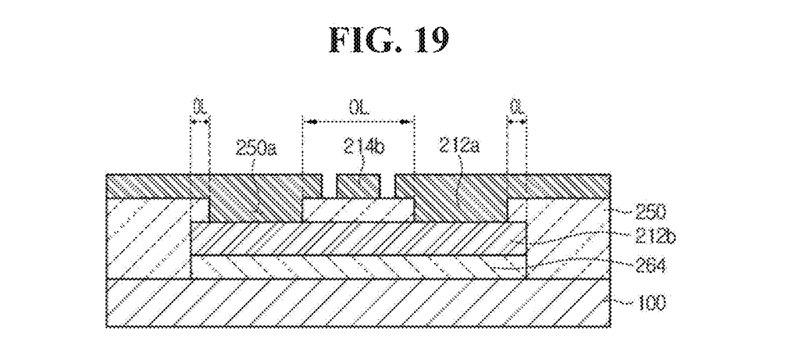
FIG. 19 is a sectional view taken along line c-c' of FIG. 18.

Referring to FIGS. 17 to 19, the touch panel according to one embodiment has a reverse structure to the stack-up structure of the touch panel shown in FIGS. 9 to 11. In other words, the second insulating layer 264, the first connection electrode part 212b, the first insulating layer 250 including the hole 250a, and the second connection electrode part 214b are sequentially stacked on the substrate 100. In this case, the second insulating layer 264 may be provided under the first connection electrode part 212b. The second insulating layer 264 may be located corresponding to the first connection electrode part 212b. In other words, the second insulating layer 264 may be located at the same position as that of the first connection electrode part 212b.

Figure 20:
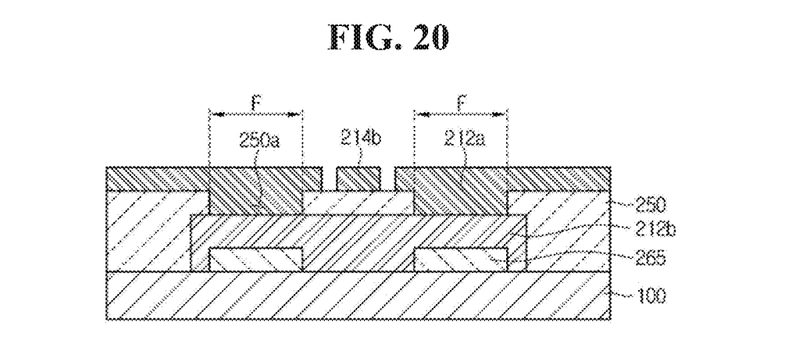
FIG. 20 is a sectional view showing the touch panel according to one embodiment.

Meanwhile, referring to FIG. 20, the second insulating layer 265 may be provided only at the position corresponding to that of the hole 250a of the first insulating layer 250. Therefore, the second insulating layer 265 may be offset from the first insulating layer 250 in the vertical direction. Referring to FIG. 19, the overlap section OL in which the first insulating layer 250 is overlapped with the second insulating layer 261 is made. However, according to the embodiment shown in FIG. 20, the visibility of the touch panel can be improved by removing the overlap section OL. In other words, according to the embodiment of FIG. 20, the second insulating layer 261 is filled in a part in which the first insulating layer 250 is not formed.

Hereinafter, the touch panel according to one embodiment will be described with reference to FIGS. 21 to 24.

Figure 13:
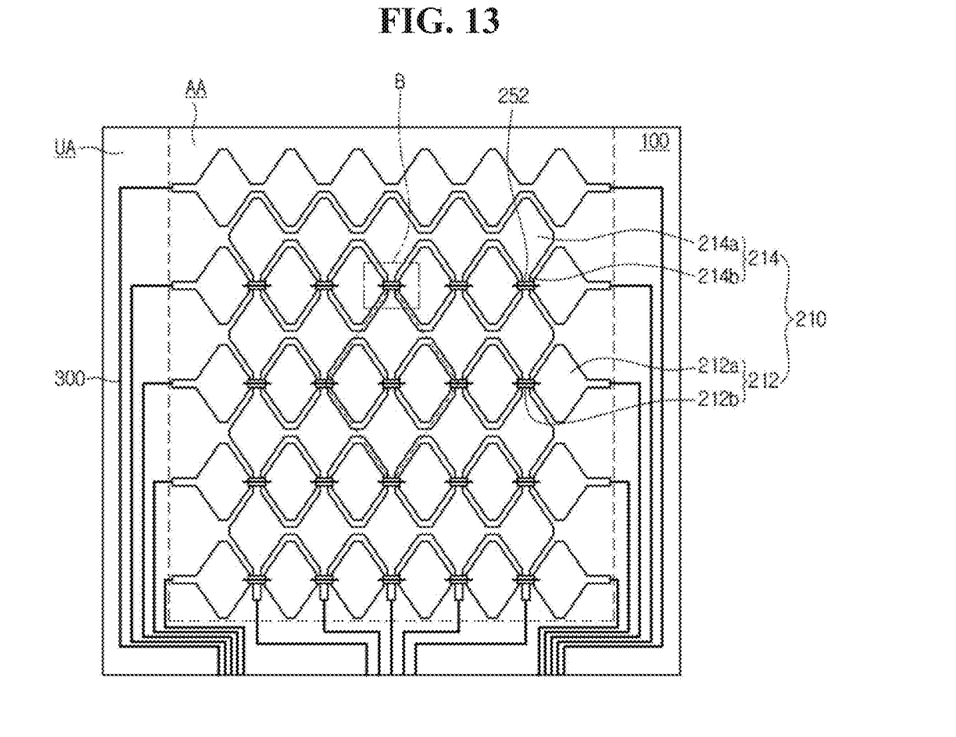
FIG. 13 is a plan view showing the touch panel according to one embodiment.
Figure 14:
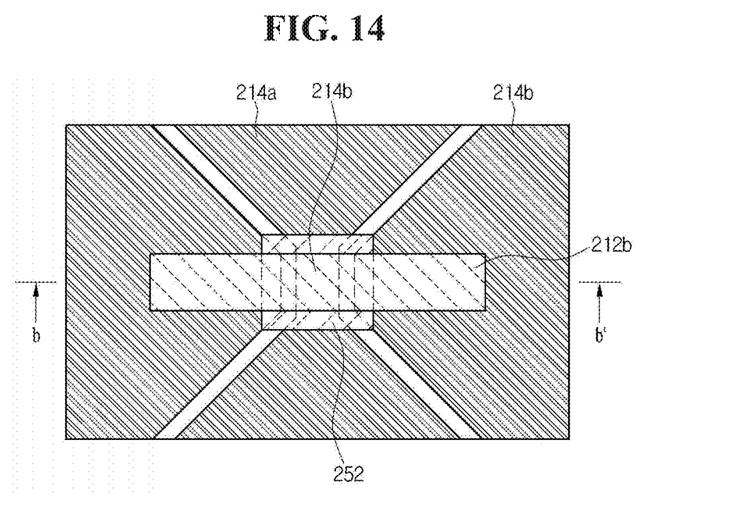
FIG. 14 is an enlarged plan view showing a part B of FIG. 13.
Figure 21:
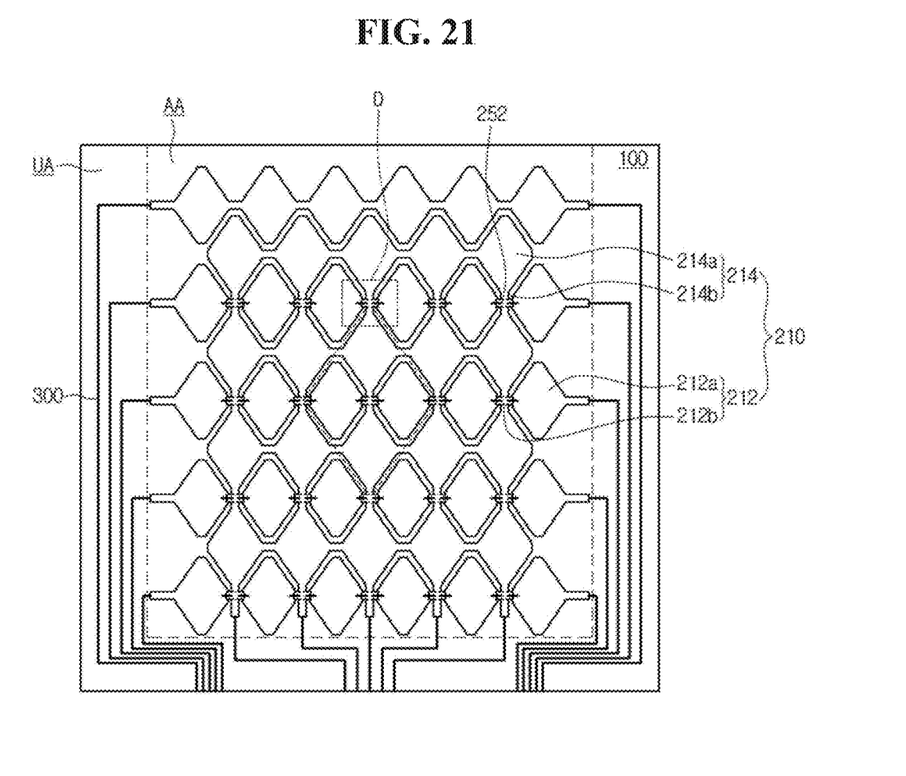
FIG. 21 is a plan view showing the touch panel according to one embodiment.
Figure 22:
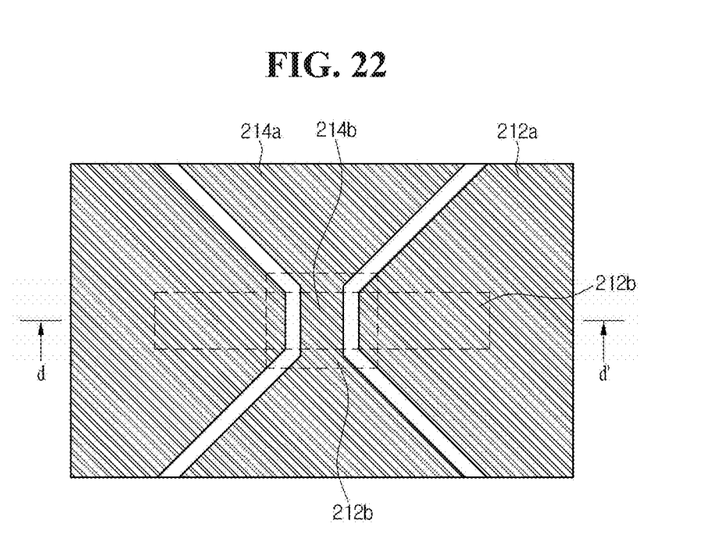
FIG. 22 is an enlarged plan view of a part D of FIG. 21.
Figure 23:
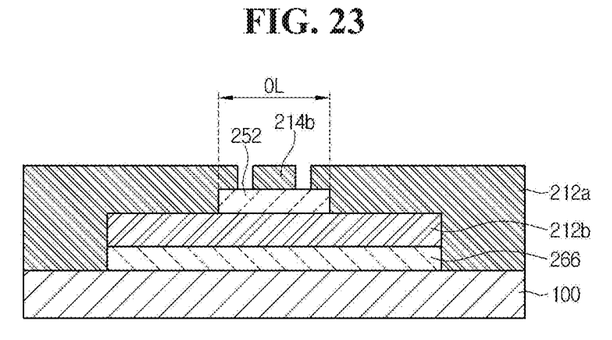
FIG. 23 is a sectional view taken along line d-d' of FIG. 22.
Figure 24:
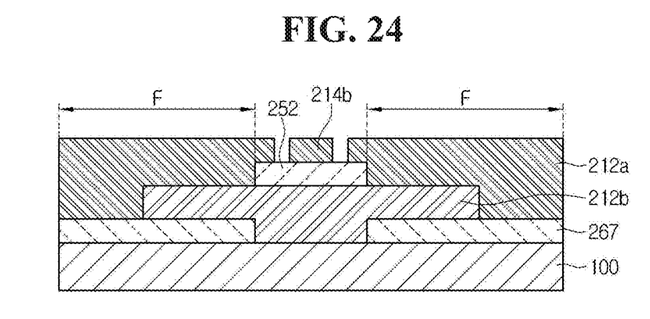
FIG. 24 is a sectional view showing the touch panel according to one embodiment.

Referring to FIGS. 21 to 23, the touch panel according to one embodiment has a reverse structure to the stack-up structure of the touch panel shown in FIGS. 13 to 15. In other words, a second insulating layer 266, the first connection electrode part 212b, the first insulating layer 252, and the second connection electrode part 214b are sequentially stacked on the substrate 100. In this case, the second insulating layer 266 may be provided under the first connection electrode part 212b. The second insulating layer 266 may be located corresponding to the first connection electrode part 212b. In other words, the second insulating layer 266 may be located at the same position as that of the first connection electrode part 212b.

Meanwhile, the substrate 100 may include the first region in which the first insulating layer 252 is provided and the second region surrounding the first region. In this case, referring to FIG. 24, the second insulating layer 267 may be provided in the second region. In other words, the second insulating layer 267 may be provided in the part F of the touch panel in which the first insulating layer 252 is not formed. Accordingly, the second insulating layer 267 may be offset from the first insulating layer 252 in a vertical direction. That is to say, in the structure of FIG. 23, the overlap section OL, in which the first insulating layer 252 is overlapped with the second insulating layer 267, is made. However, according to the embodiment shown in FIG. 24, the visibility of the touch panel can be improved by removing the overlap section OL. In other words, according to the embodiment of FIG. 24, the second insulating layer 267 is filled in the part F in which the first insulating layer 252 is not formed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a substrate;
   a sensor part on the substrate;
   an insulating layer on the substrate; and
   a connection electrode to connect the sensor part on the substrate;
   wherein the insulating layer comprises first and second insulating layers, and the first and second insulating layers are provided while interposing the connection electrode therebetween;
   wherein the first insulating layer is disposed on the sensor part and the connection electrode;
   wherein the first insulating layer comprises a hole to connect the connection electrode with the sensor part, and
   wherein the second insulating layer has a width that is less than a width of the connection electrode or corresponds to the width of the connection electrode.

2. The touch panel of claim 1, wherein the connection electrode is sandwiched between the first and second insulating layers.

3. The touch panel of claim 1, wherein the second insulating layer is provided at a position corresponding to a position of the connection electrode.

4. The touch panel of claim 3, wherein the connection electrode is closer to the substrate as compared with the sensor part.

5. The touch panel of claim 1,
   wherein the second insulating layer is provided only at a part corresponding to the hole.

6. The touch panel of claim 5, wherein the connection electrode is closer to the substrate as compared with the sensor part.

7. The touch panel of claim 1, wherein the first insulating layer is provided on the connection electrode and the second insulating layer is provided at a position corresponding to a position of the connection electrode.

8. The touch panel of claim 7, wherein the sensor part is closer to the substrate as compared with the connection electrode.

9. The touch panel of claim 7, wherein the connection electrode is closer to the substrate as compared with the sensor part.

10. The touch panel of claim 1, wherein the first insulating layer is provided on the connection electrode, the substrate comprises a first region, in which the first insulating layer is provided, and a second region surrounding the first region, and the second insulating layer is provided in the second region.

11. The touch panel of claim 10, wherein the second insulating layer is offset from the first insulating layer in a vertical direction.

12. The touch panel of claim 10, wherein the second insulating layer is provided in the first insulating layer.

13. The touch panel of claim 10, wherein the sensor part is closer to the substrate as compared with the connection electrode.

14. The touch panel of claim 10, wherein the connection electrode is closer to the substrate as compared with the sensor part.

15. The touch panel of claim 1, wherein the first and second insulating layers comprise a same material.

16. The touch panel of claim 1, wherein the second insulating layer comprises a photoresist material.

17. A touch panel comprising:
   a substrate;
   a sensor part on the substrate;
   an insulating layer on the substrate; and
   a connection electrode to connect the sensor part on the substrate;
   wherein the insulating layer comprises first and second insulating layers, and the first and second insulating layers are provided while interposing the connection electrode therebetween;
   wherein the first insulating layer comprises a hole to connect the connection electrode with the sensor part, and the second insulating layer is provided at a position corresponding to a position of the hole; and
   wherein the second insulating layer is offset from the first insulating layer in a vertical direction.

* * * * *